(12) United States Patent
Komachi et al.

(10) Patent No.: US 6,735,369 B2
(45) Date of Patent: May 11, 2004

(54) HOLLOW OPTICAL FIBER AND METHOD FOR MANUFACTURING THE SAME

(75) Inventors: Yuichi Komachi, Tokyo (JP); Katsuo Aizawa, Kanagawa (JP)

(73) Assignee: Machida Endoscope Co., Ltd., Tokyo (JP)

( * ) Notice: Subject to any disclaimer, the term of this patent is extended or adjusted under 35 U.S.C. 154(b) by 59 days.

(21) Appl. No.: 10/139,424

(22) Filed: May 6, 2002

(65) Prior Publication Data

US 2002/0172484 A1 Nov. 21, 2002

(30) Foreign Application Priority Data

May 16, 2001 (JP) ........................................ 2001-146031

(51) Int. Cl.[7] ................................................. G02B 6/20
(52) U.S. Cl. ........................ 385/125; 385/128; 385/141; 65/393
(58) Field of Search ................................ 385/123–128, 385/141–145; 65/385, 393

(56) References Cited

U.S. PATENT DOCUMENTS 4,930,863 A * 6/1990 Croitoriu et al. ............. 385/125
5,440,664 A * 8/1995 Harrington et al. ........... 385/125
6,074,342 A 6/2000 Odanaka et al.
6,408,889 B1 6/2002 Komachi

* cited by examiner

*Primary Examiner*—Phan T. H. Palmer
(74) *Attorney, Agent, or Firm*—Brown & Michaels, PC

(57) ABSTRACT

A hollow optical fiber 10 has an intermediate dielectric layer 12 interposed between an inner periphery side dielectric layer 11 facing a hollow core portion 10a and a metal layer 13. The inner periphery side dielectric layer 11 is formed of calcium fluoride. The intermediate dielectric layer 12 is formed of yttrium fluoride. Metal of the metal layer 13 can be prevented from dispersing into the dielectric layers 12, 11 by the intermediate dielectric layer 12 formed of yttrium fluoride. The hollow optical fiber 10 is manufactured by vapor depositing calcium fluoride on an outer peripheral surface of an acid-soluble glass tube 20 (base material), then vapor depositing yttrium fluoride on its outer peripheral surface, then vapor depositing a metal layer formed of silver, gold or the like on its outer peripheral surface, and thereafter, dissolving the glass tube 20 with acid.

3 Claims, 2 Drawing Sheets

Metal layer : Silver
Intermediate dielectric layer : Yttrium fluoride
Inner periphery side dielectric layer : Calcium fluoride

HOLLOW OPTICAL FIBER AND METHOD FOR MANUFACTURING THE SAME

BACKGROUND OF THE INVENTION

This invention relates to a hollow optical fiber and a method for manufacturing the same.

Attention is paid to hollow optical fibers as optical fibers for transmitting an infrared ray having a wavelength of from 2 μm to ten-odd μm which is useful in the medical and industrial field. Optical fibers of this type each have a core which is hollow and a clad formed of a metal layer such as silver or the like. A dielectric layer is disposed on an inner periphery of the metal layer for the purpose of enhancing a transmission rate. As one example of the material of a dielectric which has been put to practical use, there is silver iodide. As those for which search and development are undergoing, there are germanium and cyclic olefin polymer. In the dielectric materials listed above, however, there exists an absorption peak P where absorption of light (transmission loss) of an infrared ray having a wavelength within a range of from 2 μm to ten-odd μm is extremely increased as shown in FIGS. 3(a) to 3(c). Because of this reason, applicable wavelength is limited and thus, the light within this range of wavelength is not suitable to spectroscopic analysis in which a variable wavelength laser is used.

On the other hand, it was found out that the above-mentioned absorption peak hardly appears in case calcium fluoride is used as a dielectric. However, its practical use involves the following problems in manufacturing process. That is, calcium fluoride is vapor deposited on an outer periphery of an acid-soluble glass tube (base material) to form a film thereon, then, a silver, for example, is vapor deposited on its outer periphery to form a film thereon and thereafter, the glass tube is dissolved with acid, thereby forming a hollow core portion. At the time of vapor deposition of silver, the silver is dispersed within the calcium fluoride. This makes it difficult to apply plating on an outer periphery of the silver. Moreover, the transmission lose is increased because light absorption occurs in the dielectric layer.

SUMMARY OF THE INVENTION

In order to solve the above problems, the present invention relates to a hollow optical fiber having a dielectric layer and a metal layer formed on an outer periphery thereof. Among all, it chiefly relates to a hollow optical fiber, in which a dielectric layer is vapor deposited on an outer periphery of an acid-soluble base material to form a film thereon, then, a metal layer is vapor deposited on an outer periphery of the dielectric layer to form a film thereon and thereafter, the base material is dissolved with acid, thereby forming a hollow core portion. According to the present invention, in such a hollow optical fiber as just mentioned above, the dielectric layer comprises an inner periphery side dielectric layer facing the hollow core portion and an intermediate dielectric layer interposed between the inner periphery side dielectric layer and the metal layer.

The inner periphery side dielectric layer is preferably formed of substance capable of reducing the transmission loss over a rather wide range of wavelength. More preferably, the material is capable of forming a film by vapor deposition and is hardly dissolved with acid. Since calcium fluoride satisfies the above conditions, it is suited to be used as the inner periphery side dielectric layer.

The intermediate dielectric layer is preferably formed of substance which is close in refractive index to the inner periphery side dielectric layer, which is capable of reducing the transmission loss over a rather wide range of wavelength, and which is good in adhesion with respect to both the inner periphery side dielectric layer and metal layer. Moreover, the substance forming the intermediate dielectric layer preferably has such a property which prevents the above-mentioned metal from dispersing therein. It is more preferable for the substance forming the intermediate dielectric layer that a film can be formed by vapor deposition. Since yttrium fluoride satisfies the above conditions, it is suited to be used as the intermediate dielectric layer. No acid-resistance is required for the intermediate dielectric layer.

The metal can be prevented from dispersing by the intermediate dielectric layer formed of yttrium fluoride, and light absorption can be prevented from occurring within the inner periphery side dielectric layer and intermediate dielectric layer. Only one fiber can cope not only with transmission of plural laser beams having different wavelengths but also with transmission of a laser beam having a variable wavelength. Thus, it can be used as a spectroscopic probe.

To manufacture the above hollow optical fiber, it is preferred that an inner periphery side dielectric layer formed of calcium fluoride or the like is vapor deposited on an outer peripheral surface of a base material of an acid-soluble glass tube or the like to form a film thereon, then yttrium fluoride (intermediate dielectric layer) is vapor deposited on an outer peripheral surface of the inner periphery side dielectric layer to form a film thereon, then a metal layer such as silver, gold or the like is vapor deposited on an outer peripheral surface of the intermediate dielectric layer to form a film thereon, and thereafter, the base material is dissolved with acid, thereby forming a hollow core portion.

DETAILED DESCRIPTION OF THE INVENTION

One embodiment of the present invention will be described hereinafter with reference to the drawings.

Figure 1:
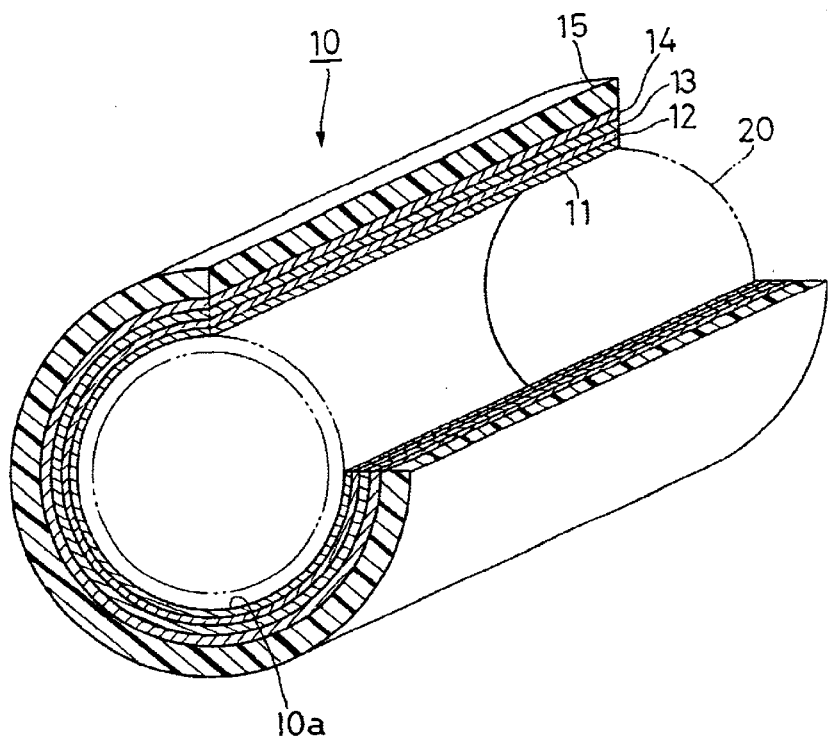
FIG. 1 shows one embodiment of the present invention and is a partly cut-away perspective view of a hollow optical fiber.

As shown in FIG. 1, a hollow optical fiber 10 has a hollow core portion 10a formed therein. The hollow optical fiber 10 includes an inner periphery side dielectric layer 11, an intermediate dielectric layer 12, a metal layer 13, a plating layer 14, and an outer jacket tube 15 which are laminated in order in a radial direction from an inner periphery side facing the hollow core portion 10a. In FIG. 1, the thickness of the layers 11 through 14 is illustrated in an exaggerated manner.

The inner periphery side dielectric layer 11 is formed of calcium fluoride (including inevitable impurities). The intermediate dielectric layer 12 relates to the subject matter of the present invention. The intermediate dielectric layer 12 is formed of yttrium fluoride (including inevitable impurities). Although the metal layer 13 is formed of silver, it may be formed of any other metal such as gold. The plating layer 14, which is formed of nickel, for example, is adapted to reinforce the metal later 13 and the dielectric layers 11, 12. The outer jacket tube 15 is formed of thermally contracting resin.

A method for manufacturing the hollow fiber 10 will now be described.

First, calcium fluoride is vapor deposited on an outer peripheral surface of an acid-soluble glass tube 20 (base material) as indicated by an imaginary line of FIG. 1, thereby forming the inner periphery side dielectric layer 11. Then, yttrium fluoride is vapor deposited on an outer peripheral surface of the inner periphery side dielectric layer 11, thereby forming the intermediate dielectric layer 12 thereon. Then, silver is vapor deposited on an outer peripheral surface of the intermediate dielectric layer 12, thereby forming the metal layer 13 thereon. According to the experiments carried out by the inventors, it was never happened that silver is dispersed into the intermediate dielectric layer formed of yttrium fluoride at the time of vapor deposition of silver. Accordingly, the film formation states of three layers 11 to 13 can be maintained in a satisfactory condition, hence light absorption can surely be prevented and transmission lose can surely be reduced.

Then, nickel is plated on an outer periphery of the metal layer 13, thereby forming the plating layer 14. Since a film of the metal layer 13 is formed in a satisfactory condition, the plating can also be conducted easily. Then, the glass tube 20 is dissolved with acid, thereby forming the hollow core portion 10a. At that time, since the inner periphery side dielectric layer 11 is formed of calcium fluoride having a large acid-resistance, it is never dissolved with acid. Then, the outer jacket tube 15 is externally fitted to an outer periphery of the plating layer 14 and thermally contracted to cover the outer periphery. It is also an interesting alternative that instead of the outer jacket tube 15 formed of thermally contracting resin, a liquid resin is applied to the outer periphery of the plating layer 14 and then, dried, thereby forming an outer jacket.

Figure 2:
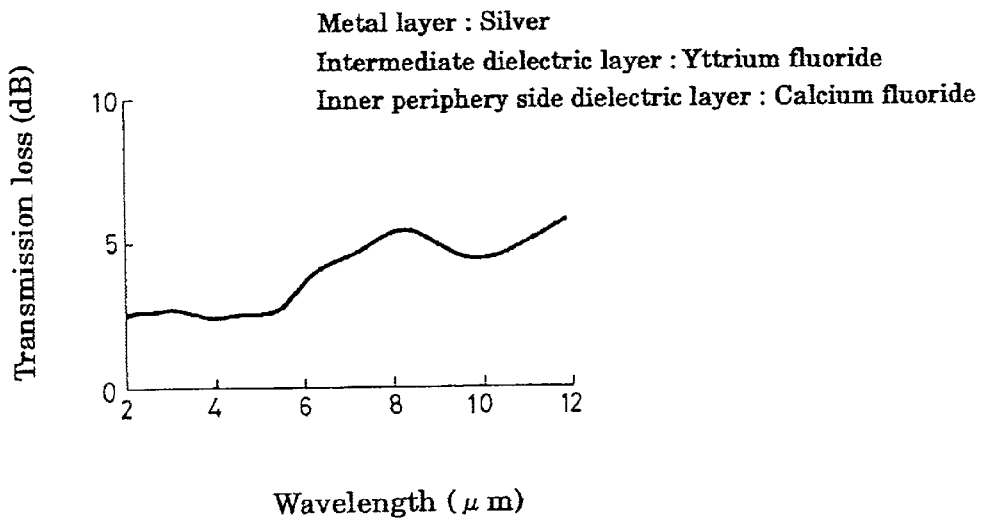
FIG. 2 is a graph showing an experiment result of transmission loss using a fiber incorporated with the present invention.
Figure 3:
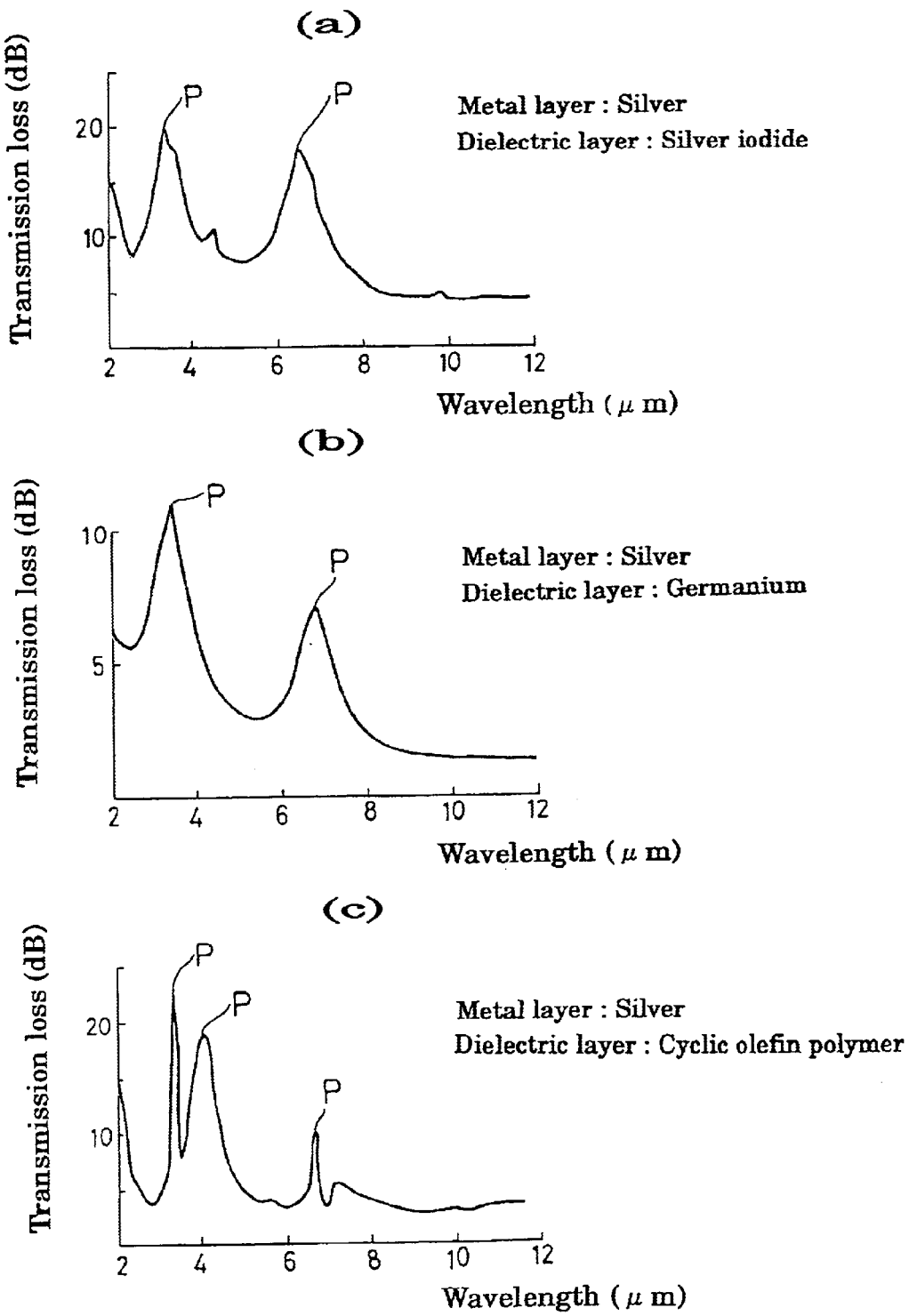
FIG. 3(a) is a graph showing transmission loss with respect to wavelength in a hollow optical fiber in which silver is used as a metal film and silver iodide is used as a dielectric film.
FIG. 3(b) is a graph showing transmission loss with respect to wavelength in a hollow optical fiber in which silver is used as a metal film and germanium is used as a dielectric film.
FIG. 3(c) is a graph showing transmission loss with respect to wavelength in a hollow optical fiber in which silver is used as a metal film and cyclic olefin polymer is used as a dielectric film.

FIG. 2 shows an experiment result of transmission loss at the time of transmission of an infrared ray through a hollow optical fiber which is incorporated with the present invention.

As shown in this Figure, the transmission loss was about 2.5 dB at a wavelength of 2.94 $\mu$m of an Er-YAG2 laser, about 2.5 dB at a wavelength of 5 $\mu$m of a CO laser, and about 4.8 dB at a wavelength of 10.6 $\mu$m of a CO2 laser, respectively. Accordingly, the invented hollow optical fiber can surely transmit any of the above lasers. Only one hollow optical fiber is good enough to cope with any of the lasers. Thus, there is no need of employment of a different optical fiber for each different kind of laser. Moreover, no absorption peak where absorption is extremely increased, was appeared within a range of a wavelength of from 2 $\mu$m to ten-odd $\mu$m of an infrared ray. Accordingly, even a wavelength variable laser such as a free electron laser can fully be transmitted over its entire wavelength. This makes it possible to use the hollow optical fiber according to the present invention as a spectroscopic probe.

What is claimed is:

1. A hollow optical fiber whose core portion is hollow, comprising an inner periphery side dielectric layer facing said hollow core portion, an intermediate dielectric layer disposed on an outer periphery of said inner periphery side dielectric layer, and a metal layer disposed at an outer periphery of said intermediate dielectric layer, said inner periphery side dielectric layer being formed of calcium fluoride and said intermediate dielectric layer being formed of yttrium fluoride.

2. A hollow optical fiber in which a dielectric layer is vapor deposited on an outer periphery of an acid-soluble base material, then a metal layer is vapor deposited on an outer periphery of said dielectric layer, and thereafter said base material is dissolved with acid, thereby forming a hollow core portion, said dielectric layer comprising an inner periphery side dielectric layer facing said hollow core portion and an intermediate dielectric layer interposed between said inner periphery side dielectric layer and said metal layer, said inner periphery side dielectric layer being formed of calcium fluoride, and said intermediate dielectric layer being formed of yttrium fluoride.

3. A method for manufacturing a hollow optical fiber comprising the steps of vapor depositing an inner periphery side dielectric layer formed of calcium fluoride on an outer peripheral surface of an acid-soluble base material to form a film thereon, then vapor depositing an intermediate dielectric layer formed of yttrium fluoride on an outer surface of said inner periphery side dielectric layer to form a film thereon, then vapor depositing a metal layer on an outer peripheral surface of said intermediate dielectric layer to form a layer thereon, and thereafter dissolving said base material with acid, thereby forming a hollow core portion.

\* \* \* \* \*